United States Patent
Gerlach et al.

(10) Patent No.: US 7,602,407 B2
(45) Date of Patent: Oct. 13, 2009

(54) METHOD FOR AUTOMATICALLY GENERATING GRAPHICALLY DISPLAYED INDICATING INSTRUMENTS

(75) Inventors: Torsten Gerlach, Braunschweig (DE); Jürgen Gotschlich, Meine (DE)

(73) Assignee: Deutsches Zentrum für Luft- und Raumfahrt e. V., Cologne (DE)

( * ) Notice: Subject to any disclaimer, the term of this patent is extended or adjusted under 35 U.S.C. 154(b) by 270 days.

(21) Appl. No.: 11/575,104

(22) PCT Filed: Jul. 5, 2005

(86) PCT No.: PCT/DE2005/001178

§ 371 (c)(1),
(2), (4) Date: Mar. 12, 2007

(87) PCT Pub. No.: WO2006/029580

PCT Pub. Date: Mar. 23, 2006

(65) Prior Publication Data

US 2008/0094418 A1   Apr. 24, 2008

(30) Foreign Application Priority Data

Sep. 17, 2004 (DE) .................. 10 2004 045 094

(51) Int. Cl.
*G09G 5/00* (2006.01)
(52) U.S. Cl. ................. 345/643; 701/14; 116/200; 340/945
(58) Field of Classification Search ............. None
See application file for complete search history.

(56) References Cited

U.S. PATENT DOCUMENTS

| | | | |
|---|---|---|---|
| 6,489,898 B1 * | 12/2002 | Nicholls | 340/975 |
| 6,721,634 B1 * | 4/2004 | Hauler et al. | 701/1 |
| 6,842,122 B1 * | 1/2005 | Langner et al. | 340/945 |
| 6,842,672 B1 * | 1/2005 | Straub et al. | 701/3 |
| 7,215,256 B2 * | 5/2007 | Reusser et al. | 340/975 |
| 2004/0113816 A1 * | 6/2004 | Maris | 340/971 |

FOREIGN PATENT DOCUMENTS

| | | |
|---|---|---|
| DE | 297 10 675 U1 | 8/1997 |
| DE | 297 22 676 U1 | 3/1998 |
| DE | 197 55 470 A1 | 9/1998 |
| DE | 198 16 823 A1 | 10/1998 |
| DE | 199 50 156 C1 | 5/2001 |
| DE | 697 11 819 T2 | 11/2002 |
| EP | 0 704 677 A1 | 4/1996 |

* cited by examiner

*Primary Examiner*—Kee M Tung
*Assistant Examiner*—David H Chu
(74) *Attorney, Agent, or Firm*—Whitham Curtis Christofferson & Cook, PC

(57) ABSTRACT

The invention relates to a method for automatically generating graphic display instruments for measured, regulation and/or control values, comprising the following steps: a) selection of a display instrument type; b) dynamic calculation of reproduction positions for reading-aid information in accordance with the type of display instrument that has been selected and with defined parameters; c) generation of the selected display instrument with the reading-aid positions in the calculated reproduction positions by means of respective classified generation objects; and d) display of the measured, regulation and/or control values in conjunction with the generated display instrument on a display.

5 Claims, 5 Drawing Sheets

METHOD FOR AUTOMATICALLY GENERATING GRAPHICALLY DISPLAYED INDICATING INSTRUMENTS

The invention relates to a method for automatically generating graphically displayed indicating instruments for measured values, regulation values and/or control values.

Indicating instruments are known multifariously as specialized items of equipment such as, for example, tachometers in motor vehicles.

For reasons of space and cost, there is an ever increasing demand for universal indicating instruments generated with the aid of a computer to be displayed on a display. For example, it is then possible in the cockpit of an airplane for various types of indicating instruments such as, for example, an artificial horizon, a compass etc to be selected for a display and displayed.

The graphical appearance of the indicating instruments, and the type and position of the reading-aid information, in particular of the scales, are permanently prescribed both in the case of the conventional indicators and in the case of the indicating instruments simulated with the aid of a computer, and are stored in the form of graphic files.

The conventional graphical stipulation of the reading-aid information is not feasible for flexible generation of indicating instruments with associated reading-aid information as a function of a respective value range.

It is therefore an object of the invention to provide an improved method for automatically generating graphically displayed indicating instruments for measured values, regulation values and/or control values, in the case of which method the reading-aid information, for example the scales, can be adapted immediately as a function of the respective value ranges to be displayed.

The object is achieved according to the invention with the aid of the method of the generic type by means of the following steps:

a) selecting a type of indicating instrument
b) dynamically calculating display positions for reading-aid information as a function of the type of selected indicating instrument and of defined parameters;
c) generating the selected indicating instrument with the reading-aid positions at the calculated display positions by means of respectively classified generation objects; and
d) indicating the measured values, regulation values and/or control values in conjunction with the generated indicating instrument on a display.

The dynamic calculation of the display positions of the reading-aid information, in particular of the scales and the scale inscriptions means that the reading-aid information is established anew each time when generating an indicating instrument. In order then subsequently to generate the selected indicating instrument, classified generation objects in the form of specialized hardware or software modules are accessed; these are specialized to a specific classified form of types of indicating instruments and reading-aid information. A class of standard indicator types that are to be graphically displayed is produced in this way; examples of these are circular scales, scales animated in rotary and/or translational fashion, and any desired dynamic scales.

The display positions of inscriptions on circular scales as indicator-aid information are preferably calculated in accordance with the following steps:

establishing the maximum inscription height and maximum inscription width of an inscription to be displayed;
determining a reference point of the inscription as a function of the maximum inscription width, of the maximum inscription height of the radius, originating from a center of the circular scale to a provided unit circle for scale marks, and of the angular positions as parameters; and
defining a character point as display position starting from which the inscription is indicated progressively upward and to the right of the character point, the character point being offset from the reference point downward by half the maximum inscription height and to the left by half the maximum inscription width.

It is thereby possible to generate an independent inscription position quickly and flexibly with the aid of font size as parameter and the ratio of the established display width and display height for universal circular scale inscriptions of any type. This is essentially achieved by virtue of the fact that the font string is drawn starting from a character point as left-hand lower corner of an inscription field, and this character point is offset downward to the left starting from a reference point by half the inscription width and inscription height. The reference point is determined from the circular scale and is located on the radius between the center of the scale and the scale mark that is assigned to the inscription, the inscription width for the x-coordinate and the inscription for the y-coordinate being added up on the radius of the unit circle for these scale marks.

The reference point $R_x$ on the horizontal axis x of a local coordinate system for the display is preferably determined according to the formula $$R_x = (r \pm B_{Max}) \times \sin(\alpha)$$

and the reference point $R_y$ on the vertical axis y is determined according to the formula $$R_y = (r \pm H_{Max}) \times \sin(\alpha).$$

The display positions of scales animated in rotary and/or transitional fashion can preferably be determined dynamically as a function of the angle of rotation of the scale and of the displacement of the scale from a centered arrangement into a first orientation, in particular the y-axis. In this case, a check is made, at least for the first and last scale mark, as to whether scale marks and/or assigned scale inscriptions lie in a defined display area. A scale inscription is displayed only when the assigned scale mark lies completely in the defined display area. Furthermore, a scale mark is displayed only up to the point of intersection with the edge of the defined display area.

The method can be used to define and display scales in any desired rectangular display area. In this case, the real visible display area is established, and projecting scale parts are no longer drawn.

The calculation of the display position of the scales animated in rotary and/or translational fashion is preferably performed in accordance with the following steps:

establishing the number of scale marks for a scale in a first orientation as a function of a defined visible display area for indicator-aid information and of the indicating instrument that is to be indicated, as a function of a defined interval division;
establishing the required number of scale marks for a scale rotated maximally starting from the first orientation;
determining a starting scale mark starting from which the scale is displayed, doing so from the displacement of a centered scale in a direction of the first orientation; and
displaying the scale marks starting from the starting scale mark, in which case, at least for the first and last displayable scale mark, a) reference points are determined at least for the outer end points and the middle point of the scale mark as a function of the angle of rotation and the displacement of the scale in a first and/or second orientation, and b) a check is made as to whether reference points lie outside the visible display area, in which case c) a scale inscription is displayed only whenever the outer reference point assigned to the scale inscription lies inside the visible display area, and otherwise the scale mark is displayed up to the point of intersection with the edge of the visible display area.

The method is based on the method of specific exclusion of objects, in which it is decided which parts of the scale (scale mark, scale inscription) fall into the non-displayable area. The required parameters are, firstly, the expansion of the surrounding area and, secondly, the parameters of the scale to be displayed. These are: number of scale marks, scale interval division, the angle of rotation and the displacement along the first orientation, for example the y-axis in a vertical direction. The dynamic display then results from the displacement and the rotation with the aid of the reference points when a determination is made at least of the outer ends of a scale mark which can be used to check whether these reference points still lie inside the defined visible display area. Only once this is not the case is the scale mark shortened by recalculating an end of the scale mark at the point of intersection with the visible display area.

Furthermore, a scale inscription is performed only when a scale mark lies completely in the visible display area, in which case it is of no importance when the scale inscription goes beyond the defined visible display area. Specifically, it is assumed in the case of the method that the defined visible display area is yet smaller than the actually visible display area on which indicator-aid information can be displayed in the display.

A dynamic calculation of the display position of visible scale marks of any type is preferably performed in accordance with the following steps:

determining the ratio of the length of the scale to be displayed to a value range of the scale determined by a defined minimum value and maximum value;

establishing an offset between the minimum value and the first displayable scale mark and/or the last displayable scale mark and the maximum value, as a function of a defined interval division; and displaying the scale marks beginning from the offset as a function of the interval division and the number of the scale marks to be displayed at a display position established by the determined ratio.

It is thereby possible in a simple way as a function of the interval division to establish exactly the number of scale marks with the aid of a starting or finishing offset that may be necessary. In this way, the information can be displayed sensibly on a scale in the case of which the starting or final values of the value range no longer fall into an interval to be completely displayed. The positioning and calculation of the scale marks is performed automatically with the aid of a few parameters, it being decisive to establish the offset between the minimum value and the first displayable scale mark, and/or the offset between the last of the displayable scale marks and the maximum value, as a function of the interval division.

The invention is explained below in more detail by way of example with the aid of the attached drawings, in which.

Figure 1:
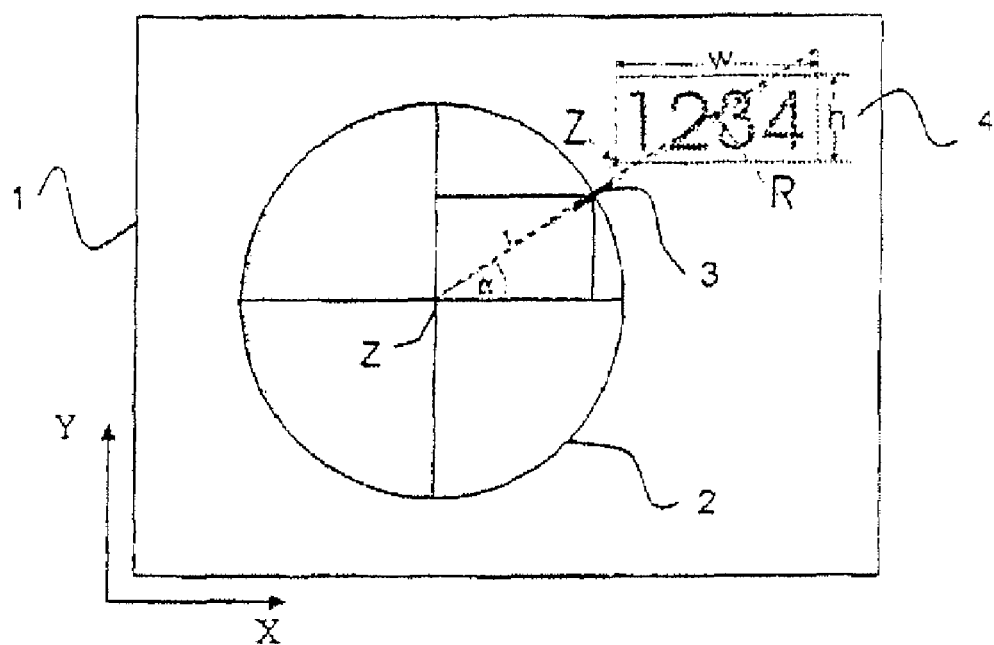
FIG. 1 shows a sketch of a circular scale with scale inscription on a unit circle.

FIG. 1 shows a circular scale 1 as indicator-aid information for an indicating instrument, for example a tachometer, in the case of which there are plotted on a unit circle 2 scale marks 3 that extend perpendicular to the unit circle 2 along a radius R from the center Z of the circular scale 1. A two-dimensional coordinate system with horizontal x-axis and vertical y-axis is defined for the circular scale 1. The scale mark is defined by the radius R of the unit circle, and by the angular position $\alpha$.

An inscription 4 whose display position must be established automatically can be assigned to a scale mark 3. The inscription 4 is aligned in each case horizontally along the x-axis irrespective of the angular position $\alpha$ at which the assigned scale mark 3 is located. The problem exists in this case by finding a uniform inscription position optically aligned with the scale mark 3, and to avoid having the inscription 4 being too far removed from the scale mark 3 or projecting into the scale 1 or the unit circle 2.

Figure 2:
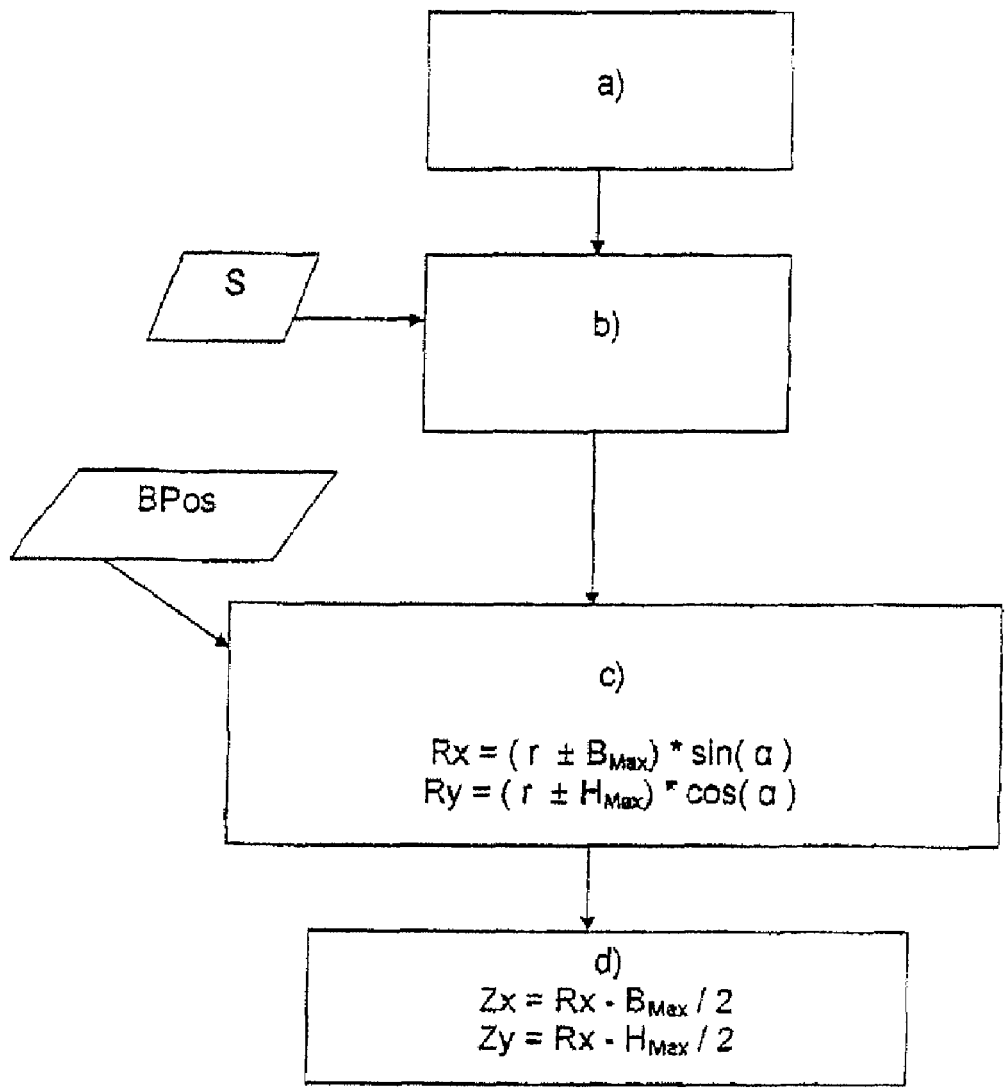
FIG. 2 shows a flowchart of the method for calculating the display position of the inscription on the circular scale from FIG. 1.

As the flowchart from FIG. 2 makes plain, the calculation of the display position of the inscription 4 on such circular scales is performed in accordance with the following steps:

step a) establishing the current vertical and horizontal angular position $\alpha$ of the scale mark 3 on the unit circle 2. The scale mark 3 need not necessarily be displayed, it can also be imaginary.

Step b) establishing the maximum inscription height $H_{Max}$ and the maximum inscription width $B_{Max}$ of the font string to be displayed with the aid of the prescribed or determined font size S and, if appropriate, of the number of characters and of types of graphic characters. The maximum inscription height $H_{Max}$ and maximum inscription width $B_{Max}$ define an imaginary rectangular text field.

Step c) establishing a reference point R(x, y) as a function of the maximum inscription width $B_{Max}$ and the maximum inscription height $H_{Max}$ with reference to the local x-y coordinate system and defined inscription position BPos inside or outside the unit circle. The reference points $R_x$ for the x-axis and $R_y$ for the y-axis are determined as follows $R_x = (r \pm B_{Max}) \times \sin(\alpha)$ $R_y = (r \pm H_{Max}) \times \cos(\alpha)$.

Here, R is the radius of the unit circle, $\alpha$ the angular position and $B_{Max}$ the maximum inscription width and $H_{Max}$ the maximum inscription height. An addition is performed when BPos defines an inscription outside the unit circle. Subtraction is performed for an inscription inside the unit circle.

Step d) defining a character point Z(x, y) as display position starting from which the inscription is progressively indicated upward and to the right of the character point Z(x, y). Starting from the reference point R(x, y), the character point Z(x, y) is offset downward by half the maximum inscription height $H_{Max}$ and to the left by half the maximum inscription width $B_{Max}$:

$$Z_x = R_x - B_{Max}/2.$$

Starting from the character point Z(x, y), the inscription is displayed upward and to the right such that the character point Z(x, y) determines the left-hand lower corner of the rectangular text field for the inscription.

Figure 3:
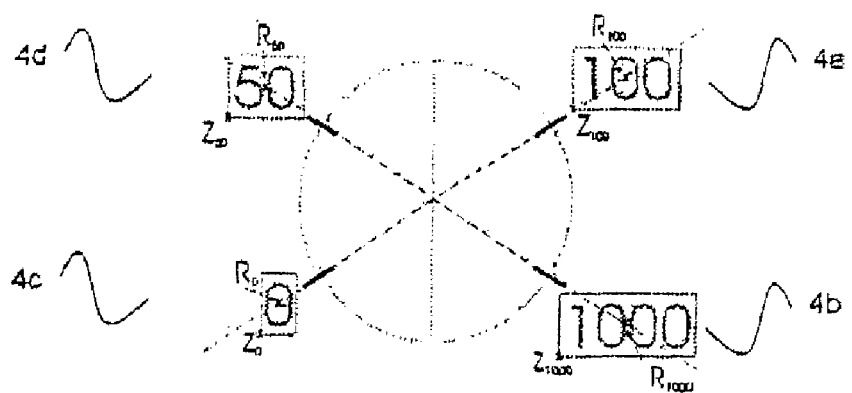
FIG. 3 shows a sketch of a circular scale with four scale marks and assigned inscriptions.

FIG. 3 shows a sketch of a circular scale having four inscriptions 4a, 4b, 4c, 4d whose display positions are calculated by successive repetition of the method in accordance with FIG. 2, and subsequently displayed. It is to be seen that the method ensures a symmetrical alignment of the inscription 4 with reference to the respective scale mark 3.

Figure 4:
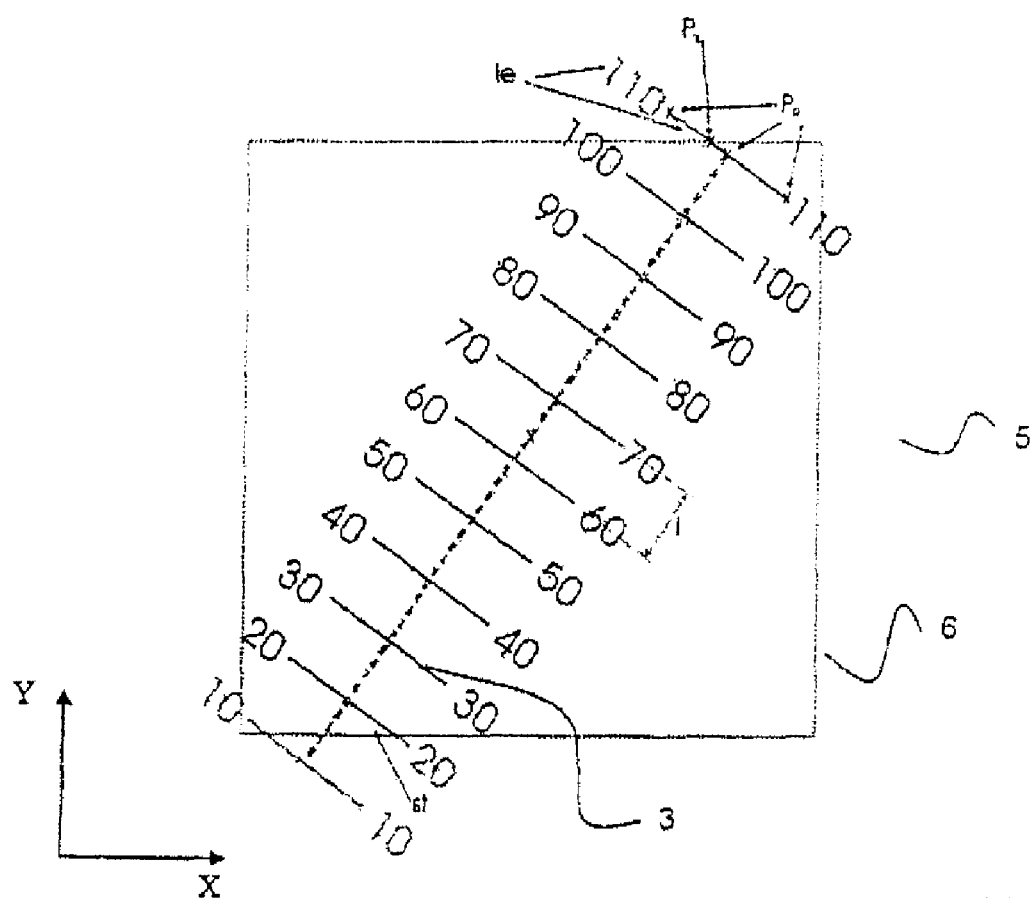
FIG. 4 shows a sketch of a scale animated in rotary and translational fashion, in a defined display area.

FIG. 4 shows a sketch of a scale, animated in rotary and translational fashion, having scale marks 3 plotted perpendicular to an axis in intervals i. The scale is indicated on a display 5, a smaller visible display area 6 being defined inside which the scale is essentially to be indicated.

The length of the scale marks, in particular of the first and last scale mark 3, is essentially a function of the angle of rotation β with reference to a first orientation in a y-direction, that is to say the vertically aligned scale. The position of the scale in the defined display area 6 is, however, a function of a displacement into the first and/or second orientation, that is to say a displacement in the x- and/or y-direction.

Figure 5:
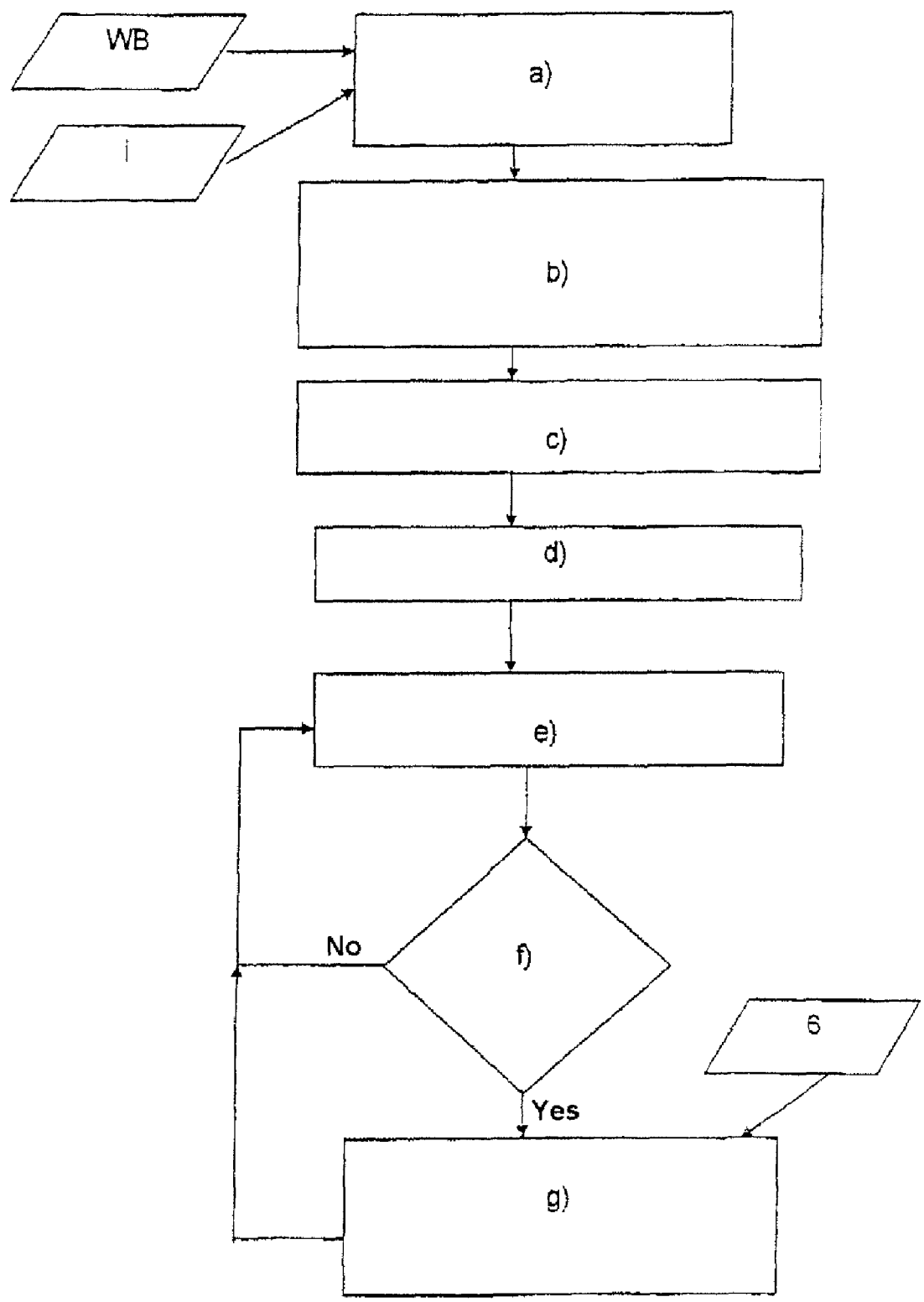
FIG. 5 shows a flowchart of the method for calculating the display position of a scale, animated in rotary and/or translational fashion, from FIG. 4.

The method in accordance with FIG. 5 is executed in order, now, to calculate the display position of such a scale animated in rotary and/or translational fashion.

In a step a), a defined visible value range WB of the scale and the interval division i is used to establish the number of scale marks N from the height of the defined display area 6 and the interval division i as well as the prescribed value range WB when the scale is displayed in a vertical orientation "β=0".

In a step b), the required number of scale marks in $N_n$ for a maximally rotated scale is established. A maximum rotation can, for example, be defined as an alignment in the case of which the scale extends from the left-hand lower corner to the right-hand upper corner of the defined display area 6 through the center Z of the display area 6. The required number of scale marks $N_n$ is calculated from the number of the additional length required marks+the number of the scale marks N established in step a). Consequently, there is only a need to calculate geometrically the difference in the height of the defined display area 6 in relation to the maximum length in the display area 6 with rotated scale, and, for this purpose, to determine the number of additional scale marks as ratio of the length to the defined interval i.

In a step c), the starting scale mark is then determined with the aid of the adjacent displacement along the Y-axis.

In a step d), the display positions for the scale marks are then established from the starting scale mark ST up to the maximally displayable number of scale marks in $N_n$, and the scale marks are, if appropriate, already displayed.

The following steps are executed repeatedly in a loop, at least for the first and the last scale mark 3:

step e): determining respectively three reference points $P_R$ of the scale mark 3 with the aid of the adjacent angle of rotation β and of the vertical displacement of the scale, at least two end points of the scale mark 3 being determined together with the midpoint in line with the scale axis, as reference point $P_R$.

A check is then made in a step f) for each reference point $P_R$ as to whether the latter lies outside the defined visible display area 6. When this is the case, no scale inscription is displayed.

In addition, the scale mark is shortened down to a new reference point $P_Z$ that results from the point of intersection of the scale mark 3 with the edge of the defined display area 6.

The scale mark 3 going beyond there, and the scale inscription are masked out as invisible element IE.

Otherwise, when the scale mark 3 lies inside the display area 5 the scale inscription is displayed irrespectively of whether it lies wholly or partially outside the display area 6.

Figure 6:
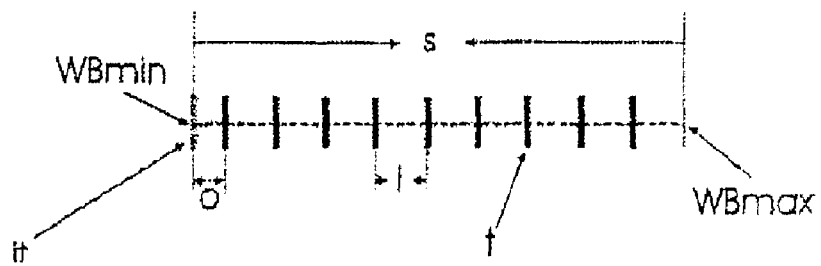
FIG. 6 shows a sketch of a dynamically generated linear scale, with offset.

FIG. 6 shows a linear scale for which a minimum value $WB_{Min}$ and $WB_{Max}$ as well as a scale interval I are prescribed. If the minimum value $WB_{Min}$ or maximum value $WB_{Max}$ does not coincide with the first and last scale mark t to be displayed, an offset O is established. The scale marks it not visible at the starting and end points, respectively, are then also not displayed.

Figure 7:
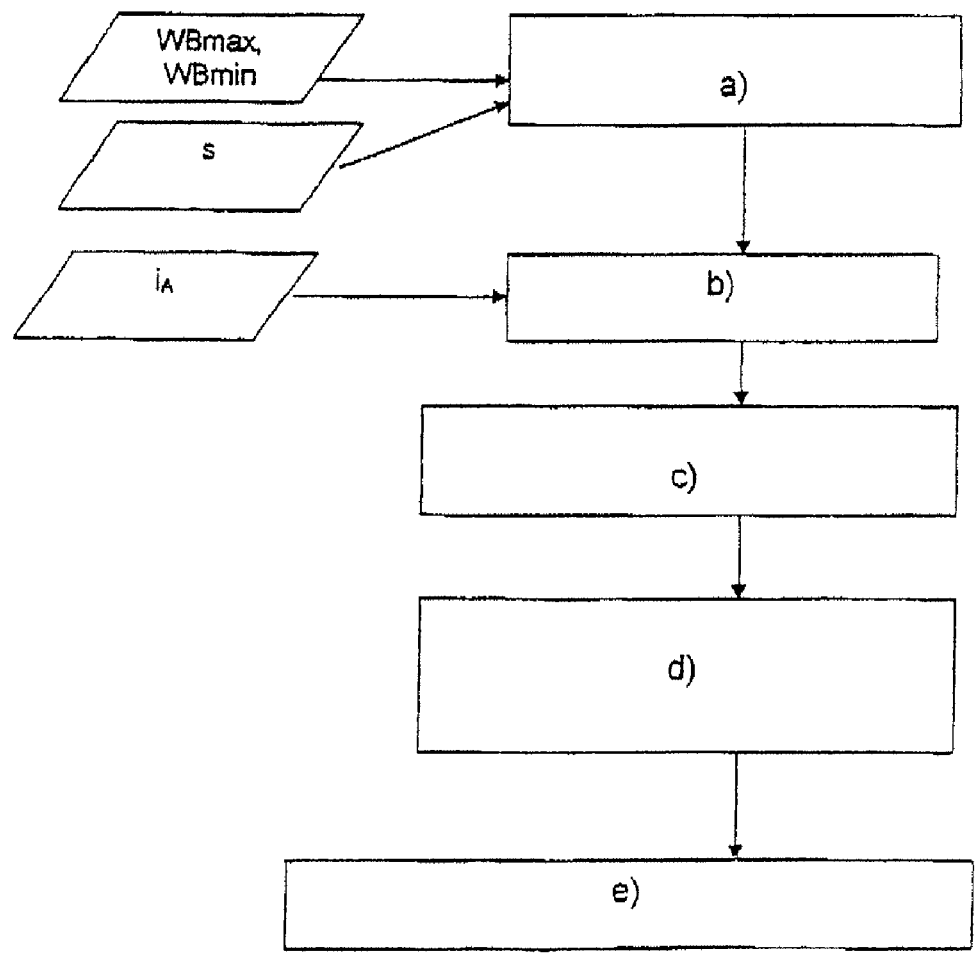
FIG. 7 shows a flowchart of the method for calculating the display positions of the visible scale marks of the linear scale from FIG. 6.

The calculation of the display position of the scale marks t is performed in accordance with the flowchart illustrated in FIG. 7.

In a step a), the value range with minimum value $WB_{Min}$ and maximum value $WB_{Max}$ as well as a length S of the scale that is defined by a starting point and end point establishes the ratio V of the entire scale length S to the value range $WB_{Max}-WB_{Min}$:

$$V = S \div (WB_{Max} - WB_{Min}).$$

In a step b), the interval division I and the ratio V are used to determine the interval division in character units of the scale, for example cm or pixels:

$$I_Z = V \times I_A,$$

$I_A$ being a defined interval division in indicator units, for example m/s. Subsequently, the value of the first displayable scale mark is established in character units in a step c) by:

establishing the number n of all the intervals: $n = WB_{Min}/I_A$.

Incrementing or decrementing the number n as a function of the sign of $WB_{Min}$: $n = n \pm 1$.

As a function of whether the scale is ascending or descending, a further correction dependent on sign is carried out:

given an ascending scale and $WB_{Min} > n \times I_A$: $n = n+1$, and given a descending scale and $WB_{Min} < n \times I_A$: $n = n-1$.

In a step d), the offset O is then established from the minimum value $WB_{min}$ of the value range up to the first displayable scale mark t and/or from the last displayable scale mark t up to the maximum value $WB_{Max}$ of the value range in character units. This can be performed with the aid of the equation:

$$O = WB_{Min} - n \times I_A$$

Subsequently, in a step e) the scale at the established display positions is displayed on a display in a way that is known in principle.

For example, the results for a scale having a scale length s of 10 cm, a value range with a minimum value $WB_{Min}$ of 0.4 m/s and a maximum value $WB_{Max}$ of 10 m/s as well as an interval division of $I_A=1$ M/s is that the first scale mark, is drawn at the value 1 m/s. This is the integral divisor of the indicator value closest to the minimum value $WB_{Min}$ for the first scale mark in relation to the interval division $I_A$. An offset C of 0.6 m/s and the correct starting position $$StartPos = WB_{Min} + O$$

are automatically established therefrom.

The invention claimed is:

1. A method for automatically generating graphically displayed indicating instruments for measured values, regulation values and/or control values, characterized by
   a) selecting a type of indicating instrument;
   b) dynamically calculating display positions for reading-aid information as a function of the type of selected indicating instrument and of defined parameters, characterized by dynamically establishing the display positions of scales, animated in rotary and/or translational fashion, as a function of the angle of rotation of the scale, and of the displacement of the scale from a centered arrangement into a first orientation, a check being made, at least for the first and last scale mark, as to whether scale marks and/or assigned scale inscriptions lie in a defined display area, and a scale inscription being displayed only when the assigned scale mark lies completely in the defined display area, and a scale mark being displayed only up to the point of intersection with the edge of the defined display area;
   c) generating the selected indicating instrument with the reading-aid positions at the calculated display positions by means of respectively classified generation objects; and
   d) indicating the measured values, regulation values and/or control values in conjunction with the generated indicating instrument on a display.

2. The method as claimed in claim 1, characterized by calculating the display position of inscriptions on circular scales as indicator-aid information in step b) in accordance with the following steps:
   establishing the maximum inscription height ($H_{Max}$) and maximum inscription width ($B_{Max}$) of an inscription to be displayed;
   determining a reference point (R(x, y)) of the inscription as a function of the maximum inscription width ($B_{Max}$), of the maximum inscription height ($H_{Max}$) of the radius (r) originating from a center of the circular scale to a provided unit circle for scale marks, and of the angular positions ($\alpha$) as parameters; and
   defining a character point (Z(x, y)) as display position starting from which the inscription is indicated progressively upward and to the right of the character point (Z(x, y)), the character point (Z(x, y)) being offset from the reference point (R(x, y)) downward by half the maximum inscription height ($H_{Max}$) and to the left by half the maximum inscription width ($B_{Max}$).

3. The method as claimed in claim 2, characterized by determining the reference point ($R_x$) on the horizontal axis x of a local coordinate system for the display according to the formula $$R_x = (r \pm B_{Max}) \times \sin(\alpha)$$

and of the reference point (Ry) on the vertical axis y according to the formula $$R_y = (r \pm H_{Max}) \times \sin(\alpha).$$

4. The method as claimed in claim 1, characterized by calculating the display positions of scales, animated in rotary and/or translational fashion, in step b) in accordance with the following steps:
   establishing the number of scale marks for a scale in a first orientation as a function of a defined visible display area for indicator-aid information and of the indicating instrument that is to be indicated, as a function of a defined interval division;
   establishing the required number of scale marks for a scale rotated maximally starting from the first orientation;
   determining a starting scale mark starting from which the scale is displayed, doing so from the displacement of a centered scale in a direction of the first orientation; and
   displaying the scale marks starting from the starting scale mark, in which case, at least for the first and last displayable scale mark,
   a) reference points are determined at least for the outer end points and the middle point of the scale mark as a function of the angle of rotation and the displacement of the scale in a first and/or second orientation, and
   b) a check is made as to whether reference points lie outside the visible display area, in which case
   c) a scale inscription is displayed only whenever the outer reference point assigned to the scale inscription lies inside the visible display area, and otherwise the scale mark is displayed up to the point of intersection with the edge of the visible display area.

5. The method as claimed in claim 1, characterized by dynamically calculating the display positions of visible scale marks in step b) in accordance with the following steps:
   determining the ratio of the length of the scale to be displayed to a value range of the scale determined by a defined minimum value and maximum value;
   establishing an offset between the minimum value and the first displayable scale mark and/or the last displayable scale mark and the maximum value, as a function of a defined interval division; and
   displaying the scale marks beginning from the offset as a function of the interval division and the number of the scale marks to be displayed at a display position established by the determined ratio.

* * * * *